(12) United States Patent
Langson (10) Patent No.: US 9,334,761 B2
(45) Date of Patent: May 10, 2016

(54) POWER COMPOUNDER

(71) Applicant: ElectraTherm, Inc., Reno, NV (US)

(72) Inventor: Richard K. Langson, Carson City, NV (US)

(73) Assignee: ElectraTherm, Inc., Reno, NV (US)

(*) Notice: Subject to any disclaimer, the term of this patent is extended or adjusted under 35 U.S.C. 154(b) by 323 days.

(21) Appl. No.: 13/937,883

(22) Filed: Jul. 9, 2013

(65) Prior Publication Data

US 2014/0013747 A1 Jan. 16, 2014

Related U.S. Application Data (63) Continuation of application No. 12/653,718, filed on Dec. 16, 2009, now abandoned, which is a continuation-in-part of application No. 11/656,309, filed on Jan. 19, 2007, now Pat. No. 7,637,108.

(60) Provisional application No. 60/760,633, filed on Jan. 19, 2006.

(51) Int. Cl.
*F01K 27/02* (2006.01)
*F01K 15/00* (2006.01)

(52) U.S. Cl.
CPC .................. *F01K 27/02* (2013.01); *F01K 15/00* (2013.01); *Y02T 10/16* (2013.01)

(58) Field of Classification Search
CPC ............. F01K 27/00; F02G 3/00; F25B 7/00; F03G 6/00; B60K 16/00
See application file for complete search history.

(56) References Cited

U.S. PATENT DOCUMENTS

| | | | | |
|---|---|---|---|---|
| 4,186,312 A * | 1/1980 | Dvorak | .................. | 290/4 R |
| 4,201,058 A * | 5/1980 | Vaughan | .................. | F01K 23/14 |
| | | | | 60/618 |
| 4,300,353 A * | 11/1981 | Ridgway | .................. | 60/618 |
| 4,362,020 A * | 12/1982 | Meacher | .................. | F01D 25/22 |
| | | | | 290/52 |
| 4,465,610 A * | 8/1984 | Enjo et al. | .................. | 252/67 |
| 4,514,643 A * | 4/1985 | Condrac | .................. | 290/40 C |
| 4,586,338 A | 5/1986 | Barrett et al. | | |
| 4,712,380 A * | 12/1987 | Smith | .................. | 60/641.2 |
| 4,733,536 A * | 3/1988 | DiBella | .................. | F01K 23/065 |
| | | | | 417/309 |
| 4,738,111 A * | 4/1988 | Edwards | .................. | F01K 25/08 |
| | | | | 290/1 A |
| 4,785,631 A | 11/1988 | Striebich | | |
| 5,056,315 A * | 10/1991 | Jenkins | .................. | 60/614 |
| 5,121,607 A | 6/1992 | George, Jr. | | |
| 5,327,987 A * | 7/1994 | Abdelmalek | .................. | B60K 6/48 |
| | | | | 180/65.25 |
| 6,234,400 B1 * | 5/2001 | Guyer | .................. | F01K 17/02 |
| | | | | 237/12.1 |
| 6,718,955 B1 | 4/2004 | Knight | | |
| 6,959,549 B2 * | 11/2005 | Tilston | .................. | F01K 13/00 |
| | | | | 60/651 |
| 6,981,377 B2 | 1/2006 | Vaynberg et al. | | |
| 7,104,061 B2 | 9/2006 | Hisanaga | | |
| 7,272,932 B2 * | 9/2007 | Watson et al. | .................. | 60/772 |
| 7,841,306 B2 * | 11/2010 | Myers | .................. | F01D 15/10 |
| | | | | 122/406.5 |
| 2003/0145583 A1 * | 8/2003 | Tanaka et al. | .................. | 60/298 |
| 2004/0088985 A1 * | 5/2004 | Brasz | .................. | F01D 15/10 |
| | | | | 60/670 |
| 2004/0088993 A1 | 5/2004 | Radcliff et al. | | |
| 2005/0056018 A1 * | 3/2005 | McFarland | .................. | F01K 25/10 |
| | | | | 60/645 |
| 2005/0183421 A1 * | 8/2005 | Vaynberg et al. | .................. | 60/641.8 |
| 2005/0188711 A1 * | 9/2005 | Wang | .................. | B60H 1/00878 |
| | | | | 62/238.6 |
| 2006/0010872 A1 * | 1/2006 | Singh | .................. | C09K 5/045 |
| | | | | 60/671 |
| 2006/0116036 A1 * | 6/2006 | Sundel | .................. | B63H 20/245 |
| | | | | 440/89 R |
| 2006/0186669 A1 * | 8/2006 | Ruggieri | .................. | F01K 17/02 |
| | | | | 290/2 |
| 2009/0211253 A1 | 8/2009 | Radcliff et al. | | |

* cited by examiner

*Primary Examiner* — Jorge Pereiro
*Assistant Examiner* — Shafiq Mian
(74) *Attorney, Agent, or Firm* — D. C. Williams (57) ABSTRACT

An apparatus and method is disclosed wherein mechanical power is returned to a prime mover producing waste heat. The apparatus includes a working fluid configured to receive thermal energy from the waste heat, a collector to hold the working fluid, an evaporator fluidly coupled to the working fluid collector for transferring the waste heat to the working fluid to change the working fluid to vaporized working fluid, a feed pump to cause the working fluid to flow between the working fluid collector and the evaporator, an expander fluidly coupled to the evaporator to receive the heated working fluid to create rotational mechanical power, and a condenser to cool the expanded working fluid. The expander is mechanically associated with the prime mover directly or via a clutch.

26 Claims, 11 Drawing Sheets

FIG. 1

PRIOR ART

POWER COMPOUNDER

RELATED APPLICATIONS

This application is a Continuation of U.S. patent application Ser. No. 12/653,718 filed on Dec. 16, 2009 and entitled "Power Compounder", which is a Continuation-in-Part application of U.S. patent application Ser. No. 11/656,309, now U.S. Pat. No. 7,637,108, filed on Jan. 19, 2007 and entitled "Power Compounder", and which claims priority from U.S. Provisional Patent Application No. 60/760,633, entitled "Power Compounder" filed on Jan. 19, 2006. The instant application claims priority from and incorporates herein by reference in their entireties all three of the applications enumerated above.

BACKGROUND

The conversion of fuels into electricity has long been the focus of engineers. The supply of the fuel to a generation site, as well as the reliability and cost of the supply, is factored into the engineering decision process.

The thrust of waste heat recovery technology is to make use of thermal energy normally discarded from a primary power conversion process. In many prior art devices, the discarded thermal energy (i.e., waste heat) is harnessed to drive additional thermo-fluid processes that can yield additional energy (i.e., electricity).

Figure 1:
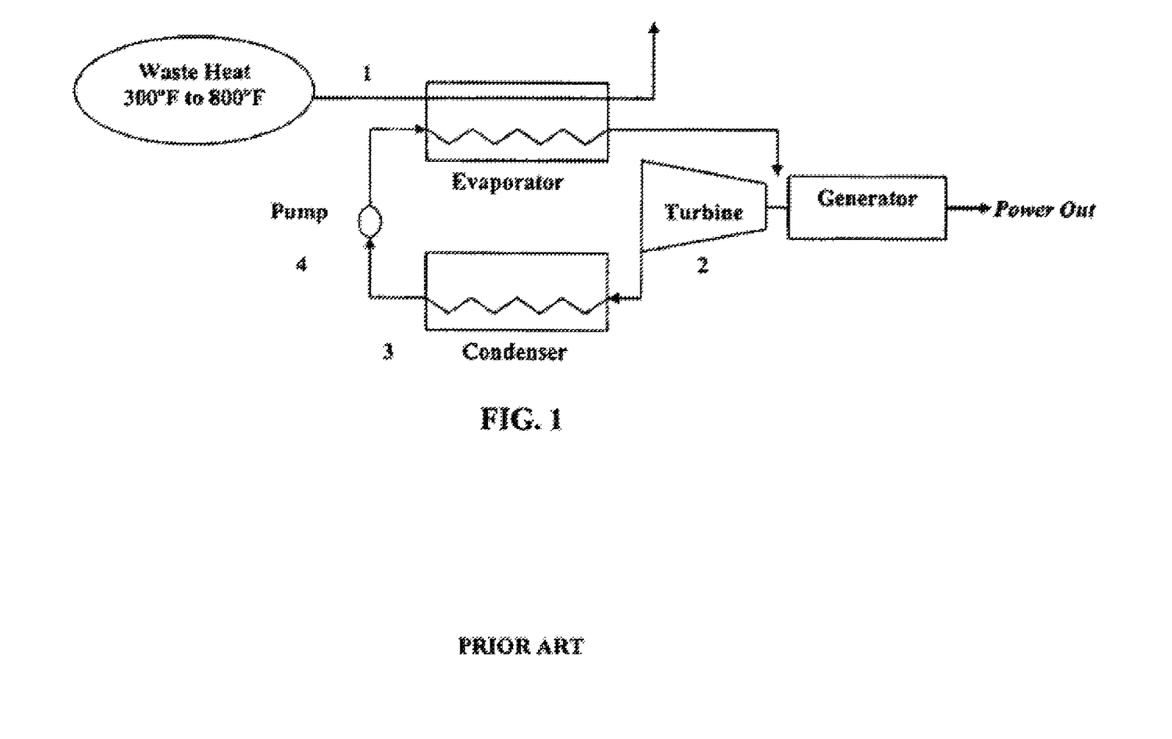
FIG. 1 is a diagram of a prior art waste heat recovery system.

Referring to prior art FIG. 1, the prior art waste heat recovery system directs a supply of waste heat measured at temperatures between 300° F. to 800° F. from a heat source to an evaporator (see numeral 1). The waste heat is transferred to a working fluid in the evaporator. The working fluid is evaporated; changes from a liquid to a vapor, in the evaporator and is expanded through a turbine (see numeral 2). The expansion of the working fluid through the turbine drives the turbine. The turbine, in turn, drives an electric generator coupled to the turbine. The generator produces electrical power. The working fluid flows to a condenser and changes phase from vapor to a liquid (see numeral 3). The liquid working fluid is then pumped back to the evaporator and begins the cycle again (see numeral 4). The above described system employs a closed-loop Organic Rankine Cycle to produce electricity from a thermal energy source, such as waste heat. This example illustrates that the prior art waste heat recovery systems were utilized to produce electricity.

Using the above concept of a reverse refrigeration cycle, either a Rankine Cycle or Organic Rankine Cycle (ORC), the waste heat of an engine can be converted to produce a more efficient engine; not electricity. However, the above example relies on turbines to operate the generator. Turbines operate at a greater rotational speed than conventional engines and require extensive, complex machinery in order to try and capture the thermal energy for reuse as mechanical energy.

What is needed in the art is a Rankine Cycle or an Organic Rankine Cycle system to convert waste heat from an engine into useful power for the engine that is simple, reliable and cost effective.

SUMMARY

The following presents a simplified summary of the present disclosure in order to provide a basic understanding of some aspects of the present disclosure. This summary is not an extensive overview of the present disclosure. It is not intended to identify key or critical elements of the present disclosure or to delineate the scope of the present disclosure. Its sole purpose is to present some concepts of the present disclosure in a simplified form as a prelude to the more detailed description that is presented herein.

A power compounder is disclosed. The power compounder comprises a working fluid configured to receive thermal energy from waste heat of a prime mover, a working fluid collector, an evaporator configured to transfer waste heat to a working fluid producing a phase change to vapor (or gas) in the working fluid, a double screw expander configured to receive the working fluid for creating rotational mechanical energy, and a condenser configured to produce another phase change in the working fluid to liquid. The double screw expander transfers the rotational mechanical energy via a shaft to the prime mover.

The disclosure is also directed toward a power compounder system. The power compounder system comprises a prime mover producing waste heat and a power compounder coupled to the prime mover. The power compounder comprises a working fluid configured to receive thermal energy from the waste heat from the prime mover; a working fluid collector configured to hold the working fluid as a liquid working fluid; an evaporator fluidly coupled to the working fluid collector, such that the evaporator is configured to transfer the waste heat to the working fluid to change the working fluid from a liquid working fluid to a vapor working fluid; a double screw expander fluidly coupled to the evaporator, such that the expander is configured to receive the vapor working fluid to create rotational mechanical energy from expansion of the vapor working fluid through the double screw expander, the double screw expander transfers the rotational mechanical energy via a shaft to the prime mover; and a condenser fluidly coupled to the double screw expander, such that the condenser is configured to receive the vapor working fluid and change the vapor working fluid to the liquid working fluid, the condenser is fluidly coupled to the working fluid collector.

The disclosure is also directed toward a method of using a power compounder system. The method comprises directing waste heat produced in a prime mover to a power compounder; transferring thermal energy from the waste heat to a liquid working fluid; transforming the liquid working fluid to a vapor working fluid in an evaporator; directing the vapor working fluid through a double screw expander fluidly coupled to the evaporator; creating rotational mechanical energy in the double screw expander when the vapor working fluid flows through the double screw expander; transferring the rotational mechanical energy via a shaft of the double screw expander to the prime mover; and directing the vapor working fluid to a condenser for transforming to the liquid working fluid, the condenser is fluidly coupled to the expander.

A power compounder system is provided and includes a prime mover producing waste heat and a power compounder coupled to the prime mover. The power compounder includes a working fluid configured to receive thermal energy from the waste heat from the prime' mover, a working fluid collector configured to hold the working fluid as a liquid working fluid, an evaporator fluidly coupled to the working fluid collector, the evaporator configured to transfer the waste heat to the working fluid to change the working fluid from the liquid working fluid to a vapor working fluid, a feed pump configured to cause the working fluid to flow between the working fluid collector and the evaporator and a double screw expander fluidly coupled to the evaporator, wherein the expander is configured to receive the vapor working fluid to create rotational mechanical energy from expansion of the vapor working fluid through the double screw expander, such that the double screw expander transfers the rotational mechanical energy via a shaft to the prime mover. The double screw expander is further coupled to the prime mover via at least one of a mechanical clutch, an electrical clutch and a Sprag clutch. The power compounder further includes a condenser fluidly coupled to the double screw expander, wherein the condenser is configured to receive the vapor working fluid and change the vapor working fluid to the liquid working fluid, wherein the condenser is fluidly coupled to the working fluid collector.

A method of using a power compounder system is provided and includes directing waste heat produced in a prime mover to a power compounder, transferring thermal energy from the waste heat to a liquid working fluid, transforming the liquid working fluid to a vapor working fluid in an evaporator, directing the vapor working fluid through a double screw expander fluidly coupled to the evaporator, wherein the double screw expander is further coupled to the prime mover via at least one of a mechanical clutch, an electrical clutch and a Sprag clutch, creating rotational mechanical energy in the double screw expander when the vapor working fluid flows through the double screw expander, transferring the rotational mechanical energy via a shaft of the double screw expander to the prime mover and directing the vapor working fluid to a condenser for transforming to the liquid working fluid, wherein the condenser is fluidly coupled to the expander.

BRIEF DESCRIPTION OF THE FIGURES

Referring now to the figures, wherein like elements are numbered alike.

DETAILED DESCRIPTION

Persons of ordinary skill in the art will realize that the following disclosure is illustrative only and not in any way limiting. Other embodiments of the disclosure will readily suggest themselves to such skilled persons having the benefit of this disclosure.

The present disclosure is a power compounder system that converts waste heat thermal energy from a source (or prime mover or engine) into rotational mechanical energy. Power compounding is the process of directly attaching an expander (or a compressor configured to act as an expander) to a shaft of a prime mover. For example, in a typical combustion engine, the thermal energy is normally discarded via jacket water heat through a radiator, engine exhaust out a stack, oil cooler, or any other conventional means. In the present disclosure, the normally discarded waste heat is recovered from the engine and harnessed. The waste heat is harnessed using either a Rankine Cycle or an Organic Rankine Cycle (ORC) power compounder having an expander (i.e., double or twin screw). The waste heat is harnessed by conversion to rotational mechanical energy which is redirected back to the engine, increasing the engine's net power output by as much as about 10% additional horsepower. This additional horsepower is achieved without using additional fuel or producing additional emissions.

Figure 2:
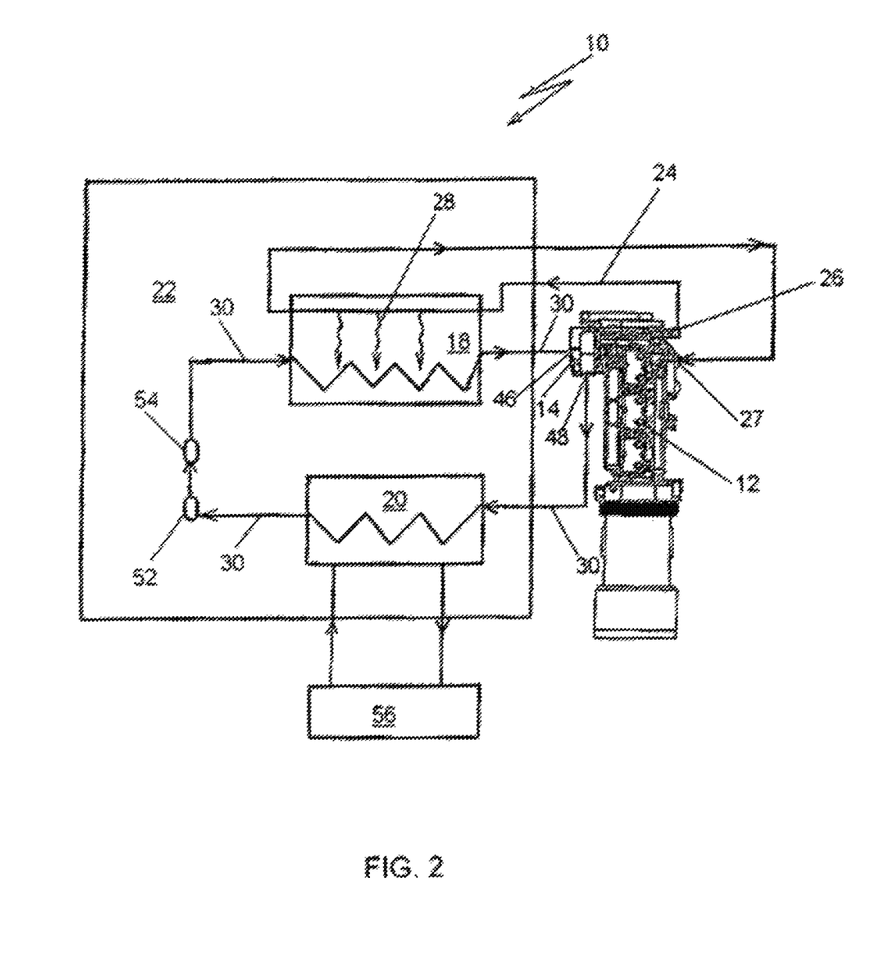
FIG. 2 is a schematic of an exemplary power compounder system.
Figure 3:
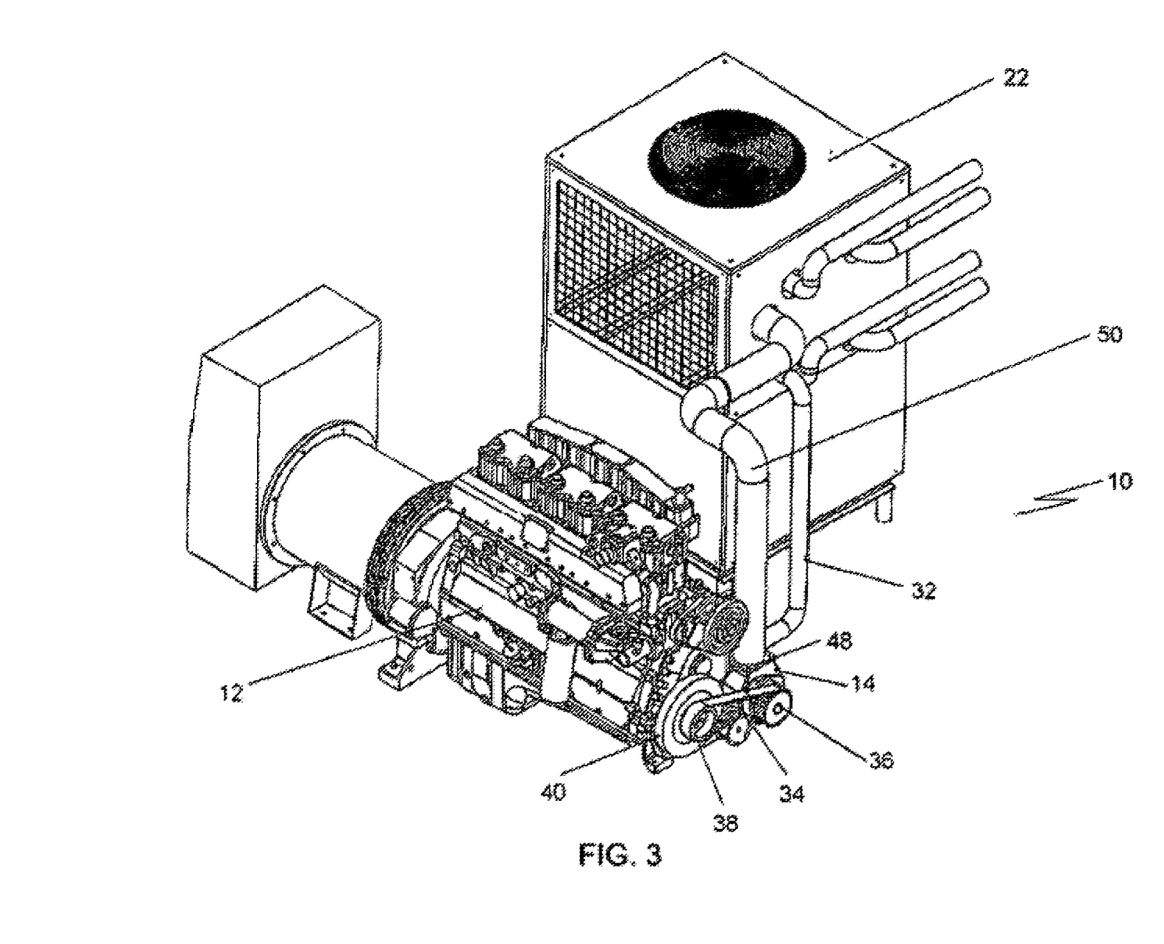
FIG. 3 is a side view of an exemplary power compounder system.
Figure 4:
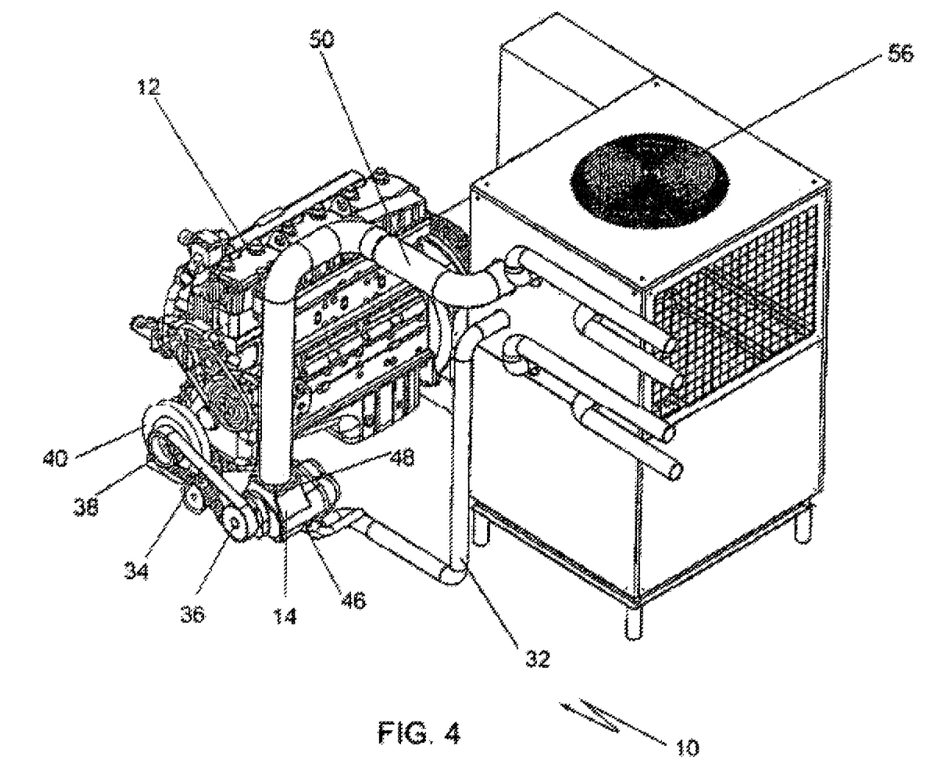
FIG. 4 is another side view of the exemplary power compounder system of FIG. 3.
Figure 5:
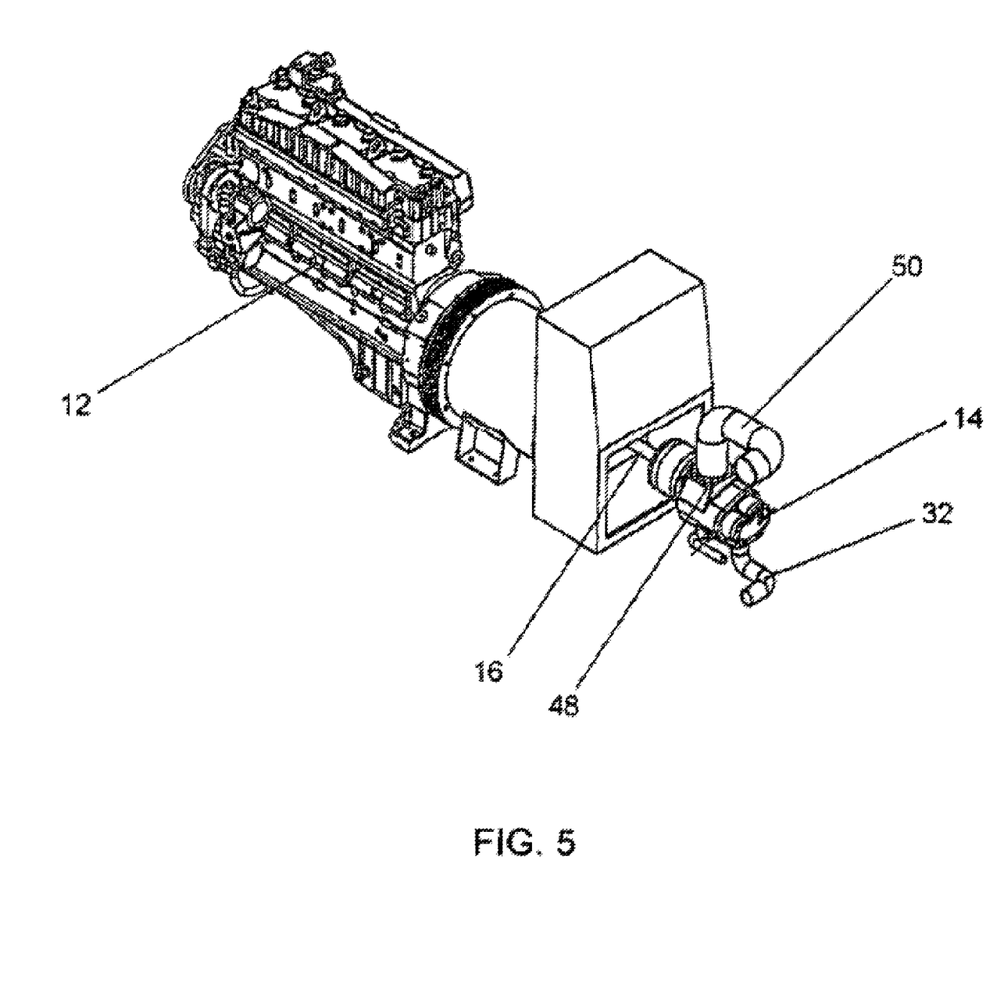
FIG. 5 is a side view of another exemplary power compounder system.

FIG. 2 is a schematic of an embodiment of the present disclosure. FIGS. 3, 4, and 5 illustrate exemplary embodiments of the power compounder 10 system coupled to a prime mover (e.g., an engine) 12. The power compounder 10 has an expander 14 that is coupled to the prime mover 12 via a shaft 16. In one embodiment illustrated in FIGS. 3 and 4, elements (i.e., the evaporator 18, the condenser 20, and the like) of the power compounder 10 are contained within a system cabinet 22.

Although a combustion engine is illustrated in FIGS. 3, 4, and 5 as the prime mover 12, any machine that utilizes mechanical energy can be utilized, including but not limited to, pumps, external combustion engines, internal combustion engines, turbines, compressors, and the like.

Referring again to FIG. 2, as the prime mover 12 is operated, waste heat (illustrated as arrow 24) is discarded from the prime mover 12. The waste heat 24 can be transferred via any known means compatible to the prime mover, including but not limited to, engine lube oil, coolant, exhaust, water jacket, and the like. Waste heat is a term that generally covers various sources of thermal energy in a transfer medium at temperatures as low as about 140° F. (such as a fluid, a hot gas, hot oil, hot water, steam, and the like). In another embodiment disclosed on page 45 of Provisional U.S. Patent Application No. 60/760,633, previously cited as priority for the instant application and incorporated herein by reference in its entirety, the waste heat supply has a minimum temperature of 180° F. The waste heat can be supplied from a wide variety of sources including but not limited to: internal combustion engines, gas turbines, gas flares in landfills, industrial manufacturing processes that continuously produce thermal energy, incinerators, boilers, water heaters, geothermal wells, methane, biogas sources, and the like.

In the preferred embodiment, waste heat 24 is directed from the prime mover 12 to the power compounder 10 via an outlet 26. The thermal energy 28 is transferred to a working fluid (illustrated as arrow 30) in the evaporator 18. The waste heat 24 medium is returned to the prime mover 12 via inlet 27. The working fluid 30 can be any known working fluid, including but not limited to, water, refrigerants, light hydrocarbons, and the like. The working fluid must be compatible with the power compounder system. Examples of refrigerants include but are not limited to, R-124, R-134a, R-245fa, and the like. The working fluid 30 is transformed in an evaporator 18 located in the system cabinet 22. The evaporator 18 transfers the thermal energy 28 from the waste heat 24 from the prime mover 12 to the working fluid 30.

The evaporator 18 exchanges the thermal energy 28 from the waste heat 24 to the working fluid 30. The evaporator 18 can be any variety of heat exchangers and fashioned to operate with the waste heat, including, but not limited to, plate, tube and shell, tube and fin, and the like. For example, if the waste heat is in the form of an internal combustion engine exhaust, the heat exchanger can comprise a gas heat exchanger. Intermediate heat exchangers (not shown) can be employed to separate the waste heat medium from the evaporator.

The working fluid 30 is heated in the evaporator 18 and changes phase from a liquid phase to a vapor (or gas) phase. The working fluid 30 having gained the thermal energy 28 and having reached a higher energy state (i.e., vapor or gas phase), flows from the evaporator 18 through piping 32 to the expander 14, and expands through the expander 14 transferring the higher thermal energy into mechanical energy. The working fluid 30 is compressed (i.e., under pressure) having potential energy as it enters the expander 14 through the inlet 46. After proceeding through the expander 14, the working fluid exits through the outlet 48 having transferred the potential energy to the shaft 16 creating kinetic energy.

In a preferred embodiment, the shaft 16 of the expander 14 can be coupled directly to a drive shaft of the prime mover 12 through a generator (see FIG. 5) or coupled with belts 34 and/or gears or pulleys 36, 38 to the crankshaft 40 (or drive shaft or any other appropriate location) of the prime mover 12 (see FIGS. 3 and 4). The shaft 16 of the expander 14 can also be connected via a pulley and idler arrangement (or directly in the case of the engine's power take-off (PTO) shaft) (not shown) to the output shaft of the prime mover 12 itself.

Figure 6:
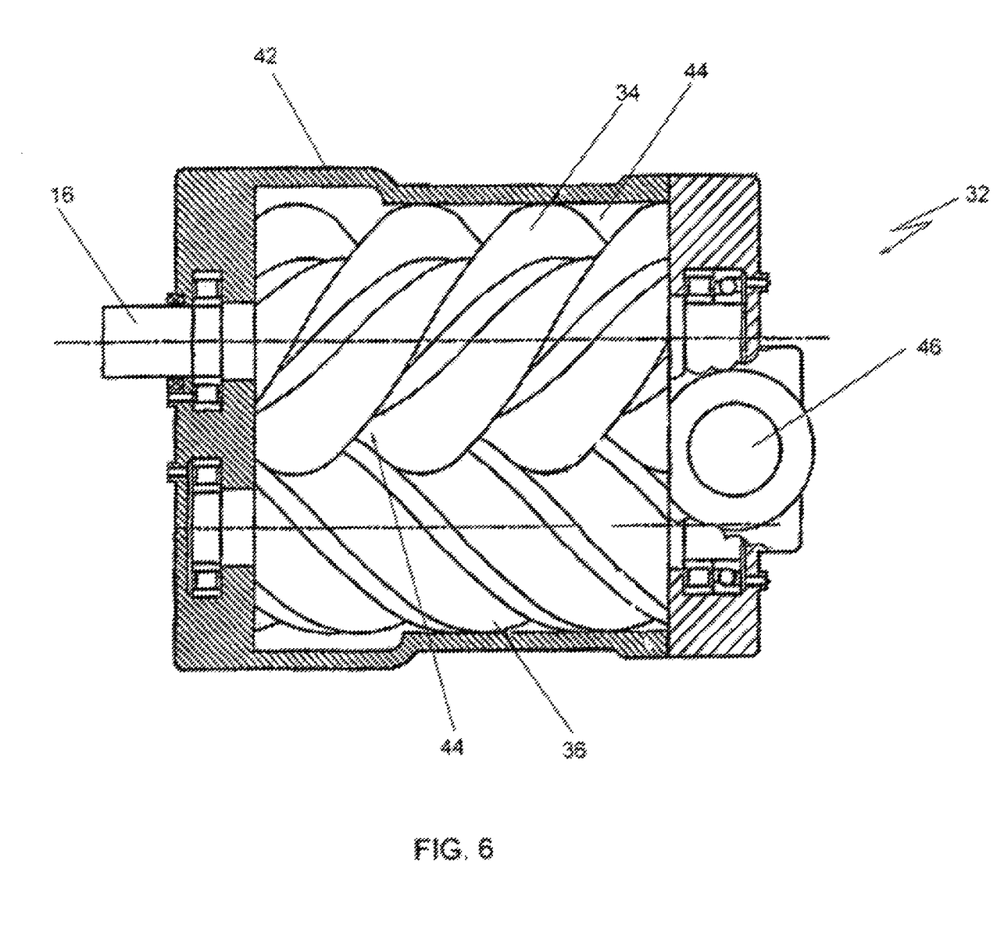
FIG. 6 is a bottom view of a double screw expander.
Figure 7:
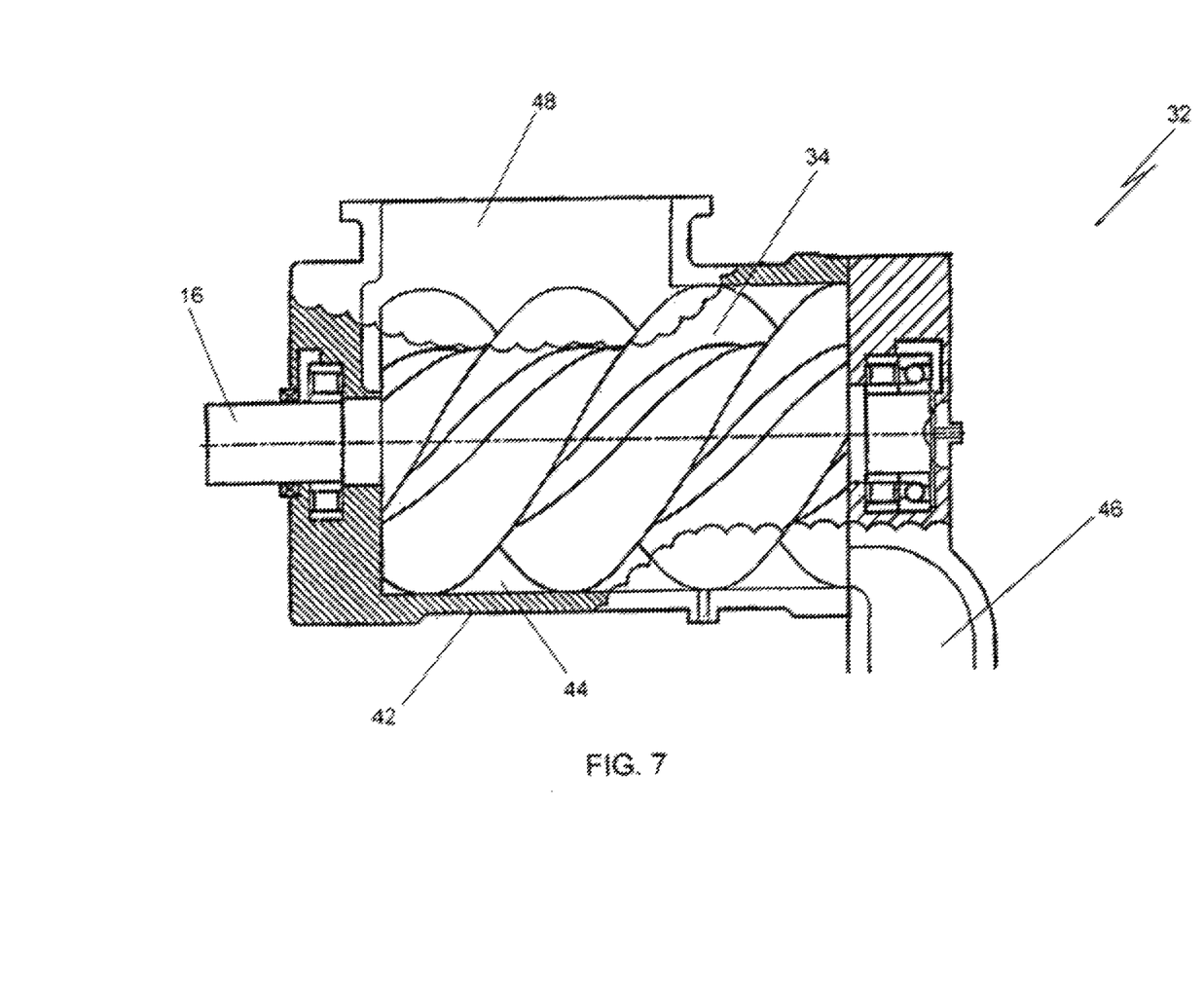
FIG. 7 is a front view of a double screw expander.

The preferred expander 14 is a double (or twin) screw expander 32. FIG. 6 illustrates a bottom view of an interior of a double screw expander 32. The double screw expander 32 uses the working fluid 30 to create mechanical rotation. The working fluid 30 expands through the double screw expander 32 causing the two rotors (or screws) 34, 36 to turn (or rotate), thus creating mechanical energy. The mechanical energy is transferred into shaft power. Referring now to FIG. 7, a front view of a double screw expander 32 is illustrated. The working fluid 30 flows into the double screw expander 32 via inlet 46 and exits via outlet 48. As the working fluid 30 expands through the double screw expander 32, mechanical energy is created. The mechanical energy is then transferred into shaft power.

A double screw expander 32 has two meshing helical rotors 34, 36 that are contained within a casing 42, which surrounds the rotors 34, 36 with a very small clearance. The spaces between the rotors 34, 36 and the casing 42 create working chambers 44. The working fluid 30 enters the double screw expander 32 through inlet 46 and expands through the working chambers 44 in the direction of rotation until it is expelled through outlet 48. Power is transferred between the working fluid 30 and the shaft 16 from torque created by the forces on the rotor 34, 36 surfaces due to the pressure of the working fluid 30, which changes with the volume of the working fluid 30.

Figure 8:
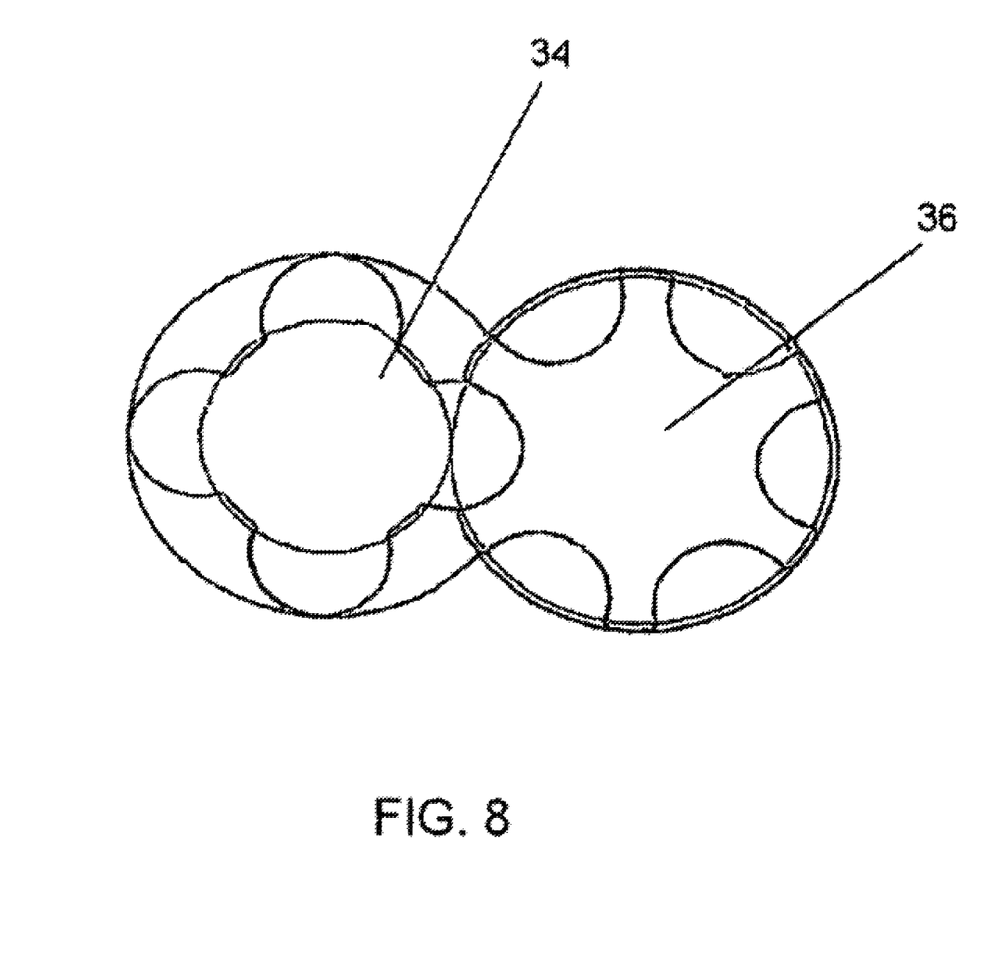
FIG. 8 is a front view of a profile of the rotors of a double screw expander.
Figure 9:
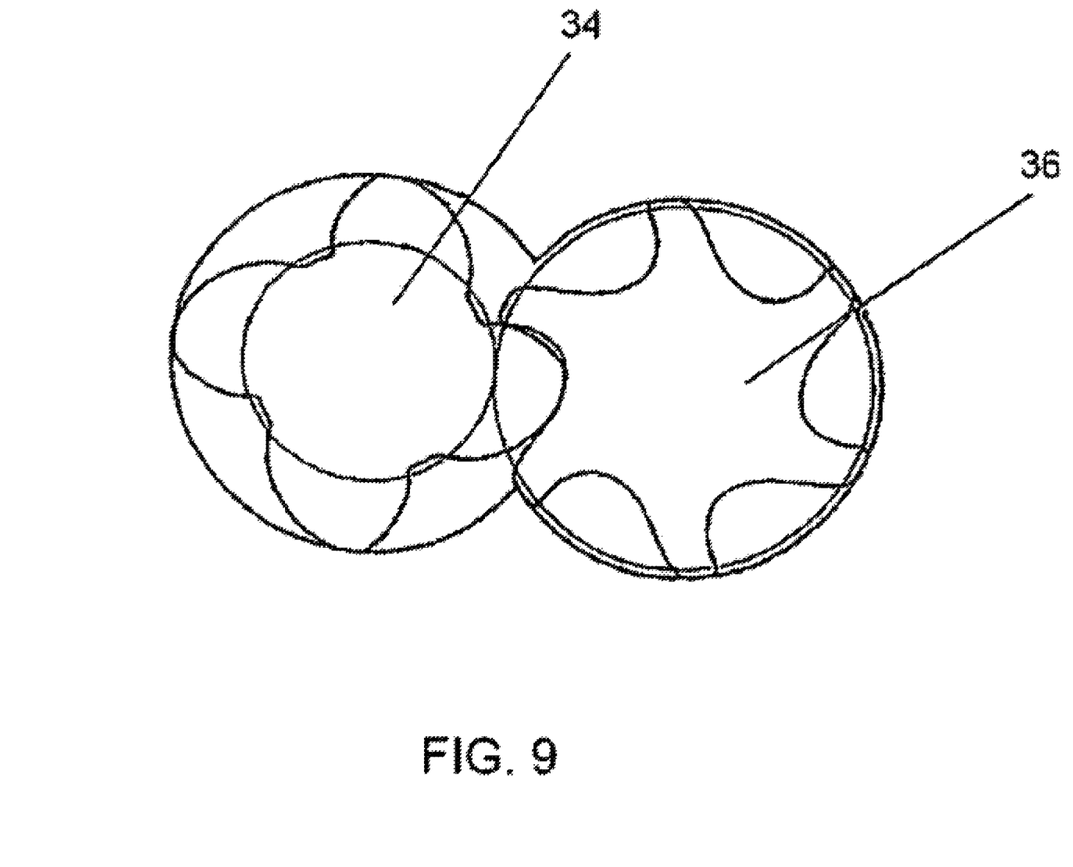
FIG. 9 is a front view of another profile of the rotors of a double screw expander.

In order to achieve a high flow rate and efficiency, the profile of the rotor 34, 36 is important. A conventional profile is illustrated in FIG. 8, in which a symmetric profile of the rotors 34, 36 is provided. The preferred embodiment for the double screw expander 32 profile is illustrated in FIG. 9. A rack generated "N" profile utilized as a rotor profile increases the rotational speed of the double screw expander 32.

Referring again to FIGS. 2 and 3, upon exiting the expander 14 through the outlet 48 to piping 50, the working fluid 30 is now a low pressure gas (or vapor) that flows to a condenser 20, where the working fluid 30 undergoes a phase change again from vapor (or gas) to liquid. In a preferred embodiment, the condenser 20 comprises at least one of shells, tubes, and fins. The use of a refrigerant, cooling water, or cooling air can enhance the cooling capabilities of the condenser 20.

Figure 10:
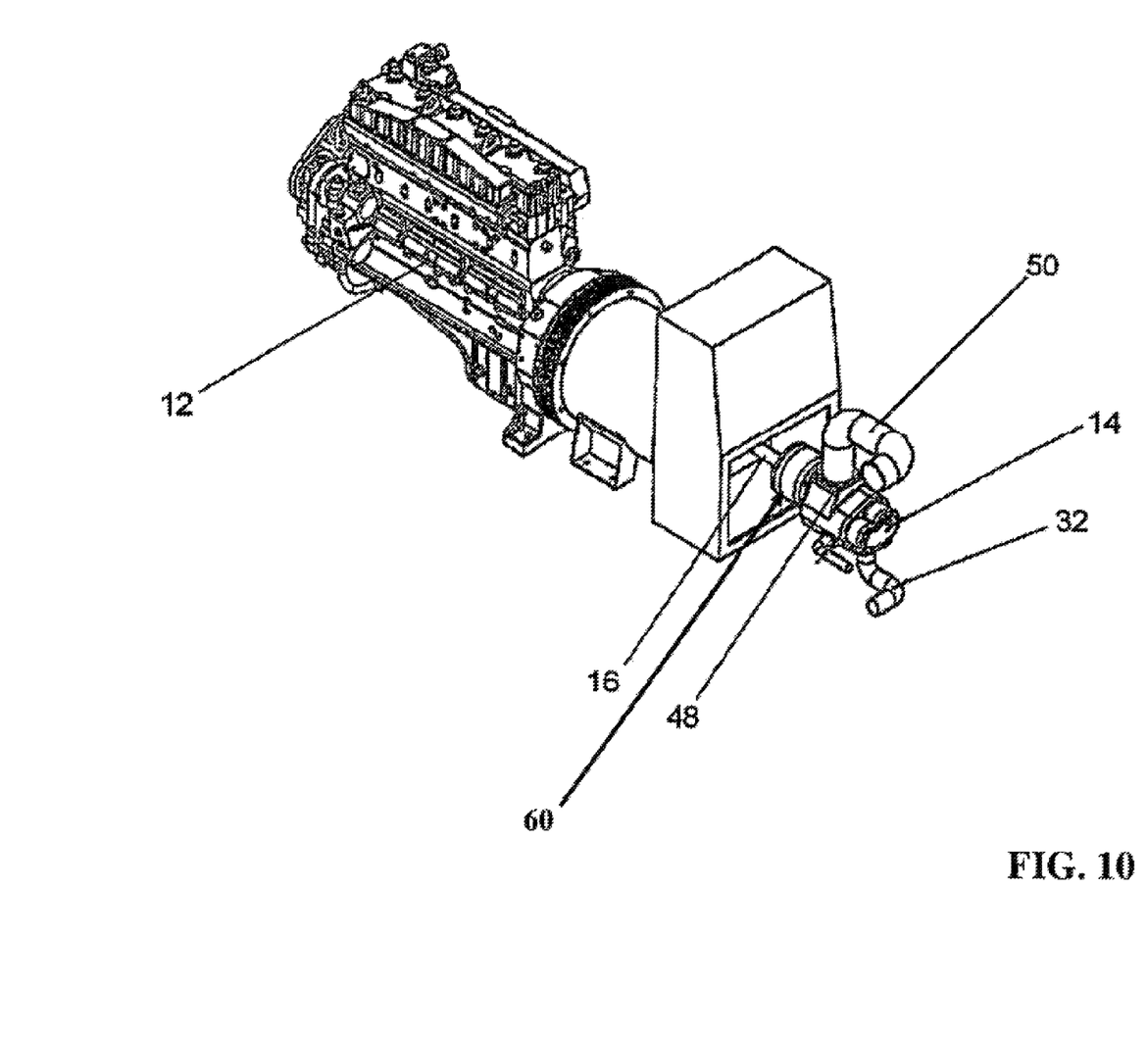
FIG. 10 is a side isometric view illustrating a clutch device being employed between the expander and a prime mover.
Figure 11:
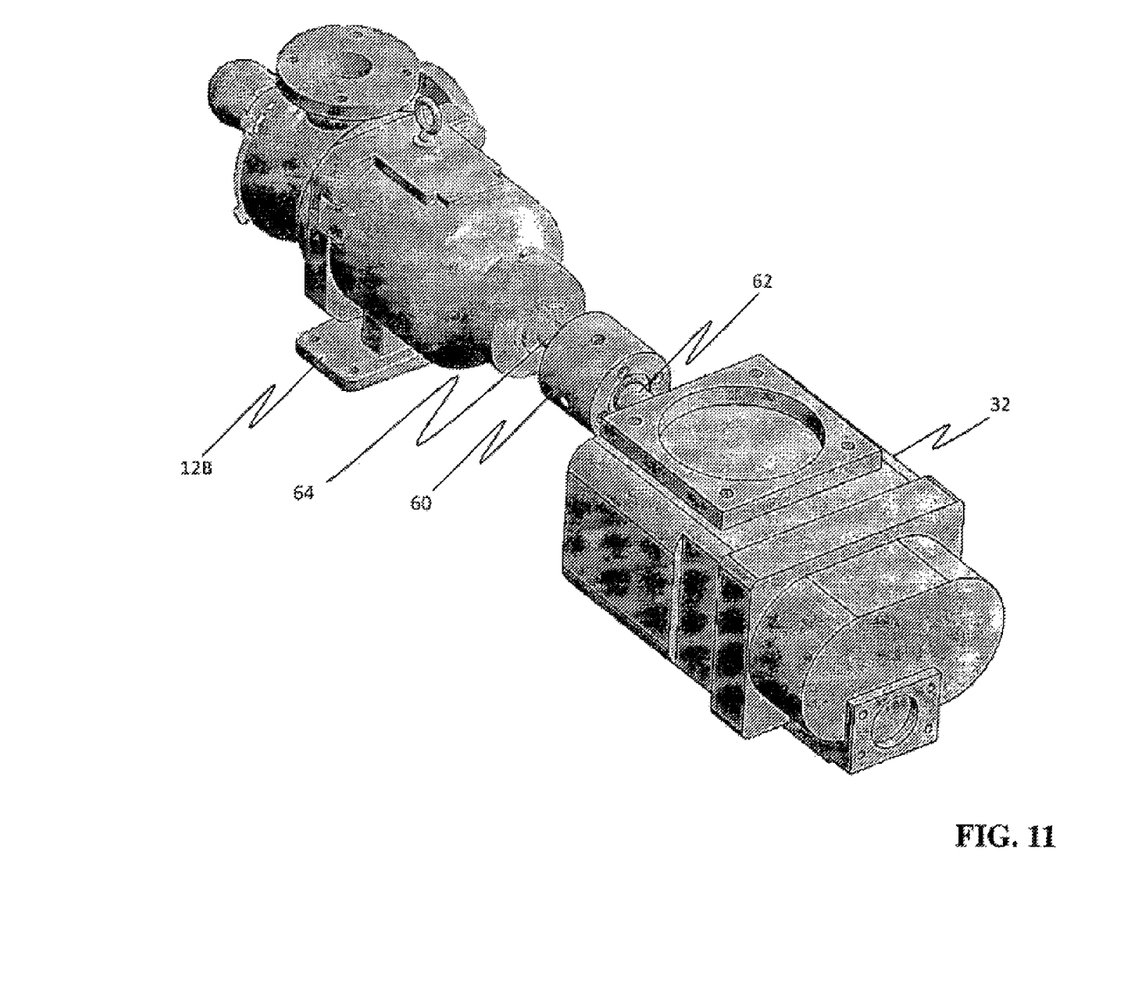
FIG. 11 is a side isometric view of illustrating a clutch device being employed between a pump and the expander.

In still yet another embodiment, referring to FIG. 10 and FIG. 11, the shaft 62 of the expander 32 (such as a double screw expander) is coupled to the shaft 64 of another device, such as the prime mover 12 or a pump 12B (see FIG. 11) via a clutch device 60, such as a mechanical clutch, an electrical clutch and/or a Sprag clutch (non-reversible and/or reversible), wherein the clutch device 60 can be used to disengage the shaft 62 of the expander 32 from the shaft 64 of the prime mover 12 to lower the revolutions per minute (RPM) of the expander 32. Simply put, a clutch is a device that can be engaged or disengaged to transmit/remove rotational forces of a rotating shaft and is particularly useful in mechanisms that include two or more rotating shafts where it is desirable to selectively transmit the motion of one shaft to another shaft. As is known, there are many different types of clutches. One type of clutch, for example, is the "Sprag" clutch which is a one-way overrunning (or freewheel) clutch that can be used to disengage a driveshaft from a driven shaft as desired. A Sprag clutch typically includes a cylindrical inner race surrounded by a cylindrical outer race with an annular space therebetween and is particularly useful when two or more motors can be used to drive the same mechanism or when the disengagement of one motor is desired. The use of a Sprag clutch is advantageous in different situations where it is desirable to lower the revolutions per minute (RPM) of the shaft of the expander 32. For example, when the prime mover 12 (or pump 12B) is sitting idle or when the prime mover 12 is not generating enough heat, it may desirable to lower the RPM's of the shaft 62 of the expander 32 to prevent the expander 32 from being damaged (i.e. burning out). This may be accomplished by engaging the clutch device 60 to allow the shaft 62 of the expander 32 to slow its rotation. When the prime mover 12 is generating a sufficient amount of waste heat, the clutch device 60 may be disengaged to allow the rotation of the shaft 62 of the expander 32 to increase.

It should be appreciated that the clutch device 60 may be controlled via any device and/or method suitable to the desired end purpose, such as an electrical switch, a mechanical switch and/or an electromechanical switch. It is contemplated that a sensing device and a controller device may be included in the power compounder system 10, wherein the sensing device and a controller device are communicated with each other and the power compounder system 10 to monitor various desired parameters of the power compounder system 10, such as the expander 32 and/or prime mover 12 (and/or pump 12B). The sensing device may monitor various parameters of the power compounder system 10 as desired, such as the waste heat from the prime mover 12 and/or the rotation speed of the shaft 62 of the expander 32 and/or the shaft 64 of the prime mover 12 and communicate these parameters to the controller device. The controller device may then control the clutch device 60 to engage and/or disengage the shaft 62 of the expander 32 from the rest of the system (i.e. prime mover 12) responsive to the parameters received from the sensing device. It is also contemplated that the controller may send instructions to the sensing device to configure which parameters the sensing device will sense. It is further contemplated that the sensing device and/or the controller may be communicated with a computing device (a local device and/or a remote device) to allow a third party to monitor the power compounder system 10 and/or control the clutch device 60 as desired. It is further contemplated that all communications may be accomplished via wired and/or wireless communications.

It should be appreciated that as used herein, working fluids include any type of working fluid suitable to the desired end purpose, such as water, steam and/or organics (including, but not limited to refrigerants and/or hydrocarbons).

The liquid working fluid 30 then flows by gravity to a receiver tank 52 configured to contain the liquid working fluid 30 (i.e., preferably a tank that is about 30 gallons to about 100 gallons). A feed pump 54 controls the flow rate of the working fluid 30 to the evaporator 18. A cooling medium, such as liquid or air, can be utilized to further condense the gaseous working fluid into a liquid working fluid. As illustrated in FIG. 2, a cooling tower 56 (or cooling fan, and the like) can be utilized to supply the cooling medium.

The admission of wet vapor to the expander 14 can be used to improve the performance of the power compounder 10 by simplifying and reducing the cost of expander 14 lubrication by dissolving or otherwise dispersing about 5% oil by mass in the working fluid 30.

The above system is a closed loop Rankine Cycle, employing water as the working fluid, or an Organic Rankine Cycle, using refrigerants or light hydrocarbons as the working fluid, or some combination thereof, in order to produce rotational mechanical power from thermal energy sources. This use of a power compounder results in an increase of net power to the host prime mover of about 5% to about 15% net power, with about 10% net power preferred.

The present disclosure includes a simple and reliable cost efficient power compounder system, either a Rankine Cycle or an Organic Rankine Cycle, using a double screw expander to produce rotational power. This rotational mechanical energy can be used to increase power output by as much as about 10% net increase to many prime movers, such as engines, pumps and mechanical power outputs for hundred of applications. Since the rotational speed of the expander of the power compounder is operated at similar rotational speeds as the prime mover, there is no need for any high speed reduction gear reducer or electronics. The rotational mechanical energy of the expander can be synchronized to the rotation of the prime mover.

While the disclosure has been described with reference to an exemplary embodiment, it will be understood by those skilled in the art that various changes may be made and equivalents may be substituted for elements thereof without departing from the scope of the disclosure. In addition, many modifications may be made to adapt a particular situation or material to the teachings without departing from the essential scope thereof. Therefore, it is intended that the disclosure not be limited to the particular embodiment disclosed as the best mode contemplated for carrying out this disclosure.

What is claimed is:

1. An apparatus to return mechanical power to a source of waste heat comprising:
    a prime mover generating waste heat;
    a one-way working fluid expander with a single shaft connection in mechanical power delivery communication with the prime mover;
    a cabinet separate from the prime mover;
        wherein the prime mover is external to the cabinet and the cabinet comprises at least a cover and side walls;
    a working fluid evaporator disposed in said cabinet, and in waste heat transfer communication with the prime mover, and in working fluid delivery communication with only the one-way working fluid expander;
    a working fluid condenser disposed in said cabinet, and in working fluid receiving communication with only the one-way working fluid expander;
    a working fluid collector disposed in said cabinet, and in gravity-feed working fluid receiving communication with only the working fluid condenser;
    a pump disposed in said cabinet, and in working fluid receiving communication with only the working fluid collector, and in working fluid delivery communication with only the working fluid evaporator;
    wherein the one-way working fluid expander, the working fluid evaporator, the working fluid condenser, the working fluid collector are arranged in a closed loop to communicate the working fluid.

2. The apparatus of claim 1 wherein the prime mover includes one or more among a compressor, a combustion engine, a pump, an incinerator, a boiler, a water heater, a turbine, or an industrial processes that produces thermal energy.

3. The apparatus of claim 1 wherein the one-way working fluid expander is in mechanical power delivery communication with only the prime mover.

4. The apparatus of claim 1 wherein the one-way working fluid expander is in mechanical power delivery communication with the prime mover via one or more clutch(es).

5. The apparatus of claim 1 wherein the one-way working fluid expander is in mechanical power delivery communication with the prime mover via a clutch and one or more among belts, gears, pulleys, and a pulley and idler arrangement.

6. The apparatus of claim 1 wherein the one-way working fluid expander is in mechanical power delivery communication with the prime mover via direct coupling of the shaft connection of the one-way working fluid expander via a clutch to a shaft of the prime mover along a common axis.

7. The apparatus of claim 1 wherein the mechanical power delivery communication comprises direct coupling of the shaft connection of the one-way working fluid expander via a clutch to a shaft of the prime mover through a generator along a common axis.

8. The apparatus of claim 1 wherein the one-way working fluid expander is at least one of a one-way working fluid screw expander and a one-way working fluid twin screw expander.

9. The apparatus of claim 1 wherein the apparatus is configured to deliver power from waste heat with a temperature of 140° F. or above.

10. The apparatus of claim 1 wherein the mechanical power delivery communication from the one-way working fluid expander to the prime mover is between 5% and 15% of the net power produced by the prime mover.

11. The apparatus of claim 1 wherein the one-way working fluid expander is in mechanical power delivery communication with the prime mover via two or more clutch(es) and one or more of any of belts, gears, pulleys, and a pulley and idler arrangement.

12. The apparatus of claim 4 wherein the one or more clutch(es) are configured such that mechanical power is exclusively delivered from the expander to the prime mover.

13. A method of returning mechanical power to a source of waste heat comprising:
    directing waste heat produced by a prime mover to an apparatus comprising a cabinet separate from the source of waste heat and employing a working fluid arranged in a closed loop;
        wherein the prime mover is external to the cabinet and the cabinet comprises at least a cover and side walls;
    transferring thermal energy from said waste heat to a low pressure working fluid liquid as it flows through a working fluid evaporator disposed in the cabinet to pressurize and heat the working fluid including converting the working fluid to a pressurized mixture of working fluid liquid and vapor;

receiving the pressurized mixture of working fluid of liquid and vapor from only the output of the working fluid evaporator in a one-way working fluid expander with a single shaft connection;

converting energy in the pressurized mixture of working fluid liquid and vapor to mechanical power via the one-way working fluid expander as said pressurized mixture of working fluid liquid and vapor flows through the one-way working fluid expander and becomes an expanded mixture of working fluid liquid and vapor;

receiving the expanded mixture of working fluid liquid and vapor from only the one-way working fluid expander in a working fluid condenser disposed in the cabinet, wherein the temperature and pressure of said expanded mixture of working fluid liquid and vapor is reduced in the working fluid condenser such that the working fluid is output as a low pressure working fluid liquid;

receiving only by the force of gravity the low pressure working fluid liquid in a working fluid collector disposed in the cabinet from only the working fluid condenser;

receiving from only the working fluid collector the low pressure working fluid liquid in a pump disposed in the cabinet;

receiving in the working fluid evaporator only the working fluid liquid pumped through and output from the pump; and coupling at least a portion of the mechanical power converted via the one-way working fluid expander to the prime mover.

14. The method of claim 13 wherein the prime mover includes one or more among a compressor, a combustion engine, a pump, an incinerator, a boiler, a water heater, a turbine, or an industrial processes that produces thermal energy.

15. The method of claim 13 wherein the coupling is only to the prime mover.

16. The method of claim 13 wherein the coupling is via a clutch.

17. The method of claim 13 wherein the coupling is via a clutch and one or more among belts, gears, pulleys, and a pulley and idler arrangement.

18. The method of claim 13 wherein the coupling is via direct coupling of the single shaft connection of the one-way working fluid expander via a clutch to a shaft of the prime mover along a common axis.

19. The method of claim 13 wherein the coupling is via direct coupling of the single shaft connection of the one-way working fluid expander via a clutch to a shaft of the prime mover through a generator along a common axis.

20. The method of claim 13 wherein the one-way working fluid expander is at least one of a one-way working fluid screw expander and a one-way working fluid twin screw expander.

21. The method of claim 13 wherein the mechanical power is generated from the waste heat at a temperature of 140° F. or above.

22. The method of claim 13 wherein the mechanical power converted via the one-way working fluid expander is between 5% and 15% of the net power produced by the prime mover.

23. The method of claim 13 wherein the step of coupling at least a portion of the mechanical power converted via the one-way working fluid expander to the prime mover further comprises coupling at least a portion of the mechanical power converted via the one-way working fluid expander to the prime mover via one or more clutch(es).

24. The method of claim 23 wherein at least one of the one or more clutch(es) is operatively connected to a sensing device, a controller, and at least one of an electrical switch, a mechanical switch, and an electromechanical switch to engage and disengage the one-way working fluid expander from the prime mover.

25. The method of claim 23 wherein at least one of the one or more clutch(es) is operatively connected to a sensing device, a controller, and at least one of an electrical switch, a mechanical switch, and an electromechanical switch to adjust the speed of the one-way working fluid expander.

26. The method of claim 23 wherein the one or more clutch(es) are configured such that mechanical power is exclusively delivered from the expander to the prime mover.

* * * * *